United States Patent
Liu

[11] Patent Number: 6,140,907
[45] Date of Patent: Oct. 31, 2000

[54] CARBON FIBER CONTACTING POSITION SENSOR

[75] Inventor: Shengli Liu, Elkhart, Ind.

[73] Assignee: CTS Corporation, Elkhart, Ind.

[21] Appl. No.: 09/137,261

[22] Filed: Aug. 20, 1998

[51] Int. Cl.[7] .................................................. H01C 10/30
[52] U.S. Cl. ........................... 338/160; 338/162; 338/202
[58] Field of Search ..................... 338/118, 160, 338/162, 176, 202, 171

[56] References Cited

U.S. PATENT DOCUMENTS

| | | | |
|---|---|---|---|
| 2,040,278 | 5/1936 | Siegel | 338/174 |
| 3,102,990 | 9/1963 | Miller et al. | 338/162 |
| 3,597,720 | 8/1971 | Burgess | 338/202 |
| 3,886,386 | 5/1975 | Hillig . | |
| 4,189,702 | 2/1980 | Maloy . | |
| 4,334,352 | 6/1982 | VanBenthuysen . | |
| 4,336,565 | 6/1982 | Murray et al. . | |
| 4,345,235 | 8/1982 | Riley et al. . | |
| 4,355,293 | 10/1982 | Driscoll | 338/184 |
| 4,430,634 | 2/1984 | Hufford et al. . | |
| 4,435,691 | 3/1984 | Ginn . | |
| 4,500,866 | 2/1985 | Stuttgart . | |
| 4,568,876 | 2/1986 | Maisch . | |
| 4,616,504 | 10/1986 | Overcash et al. . | |
| 4,688,420 | 8/1987 | Minagawa . | |
| 4,703,649 | 11/1987 | Eitoku et al. . | |
| 5,039,975 | 8/1991 | Ishihara . | |
| 5,133,321 | 7/1992 | Hering et al. . | |
| 5,139,862 | 8/1992 | Swift et al. . | |
| 5,177,529 | 1/1993 | Schroll et al. . | |
| 5,321,980 | 6/1994 | Hering et al. . | |
| 5,385,068 | 1/1995 | Whit et al. . | |
| 5,415,144 | 5/1995 | Hardin et al. . | |
| 5,416,295 | 5/1995 | White et al. . | |
| 5,725,707 | 3/1998 | Koon et al. . | |
| 5,843,567 | 12/1998 | Swift et al. | 338/114 |

FOREIGN PATENT DOCUMENTS

| | | | |
|---|---|---|---|
| 2517064 | 10/1976 | Germany | 338/202 |
| 4442617A1 | 11/1994 | Germany . | |

*Primary Examiner*—Karl D. Easthom
*Attorney, Agent, or Firm*—Mark P. Burgeois; Mark W Borgman

[57] ABSTRACT

A contacting position sensor that has a carbon fiber contactor tip design for long life and low wear characteristics. The position sensor has a housing and a resistive element and is located on a substrate mounted within the housing. A carbon fiber contactor is mounted within the housing and has a first and second beam and carbon fibers attached to an end of each of the beams. The carbon fibers are in electrical contact with the resistive element. The carbon fibers are attached to the beam by a conductive epoxy or the carbon fibers are attached to the beam by a crimping. The contactor is attached to a rotor or a drive arm.

11 Claims, 2 Drawing Sheets

CARBON FIBER CONTACTING POSITION SENSOR

BACKGROUND OF THE INVENTION

1. Field of the Invention

This invention relates to position sensors. In particular, there is a position sensor that has a fiber contactor tip design for long life made of carbon for example.

2. Description of the Related Art

Various devices and methods of dealing with the design of position sensors are legion. More specifically, contacting position sensors have been formed from a contactor tip and a resistive element. The tip moves over the surface of the element and causes an output resistance reading to change. Polymer resistive position sensors are a variable resistor type of electrical devices with a voltage output that converts the linear or angular displacement to an electrical signal. The contactors are conductive moving elements in the sensors that control the voltage output by sliding over a polymer resistive element. These contactors represent a unique type of sliding electrical contacts. They are miniature in design and size. The contactor is typically an alloy of platinum, silver, palladium and gold. The current density is low at approximately 10 A/sqin. or less. They run at slow sliding speeds, around 50 fpm or slower. The contactor should be capable of making good electrical contact under all the application environments, basically, heat and cold, dry and humid, dust, vibration, and etc as other types of contacts do. However, the reliability and noise performance requirements are more crucial than with other types of sliding contacts. The contactor must also have good corrosion resistance.

Currently, the contactors of this type are constructed with metallic materials or alloys, because they are good conductors, easy to process and readily available. Noble alloys such as gold, palladium and platinum alloys are often used because of their non-tarnishing character in all the common air pollutants. These noble alloy contactors have been used for decades, and have been well accepted in the industry. Because of their industry-wide importance the American Society for Testing and Materials has adopted numerous standards for these alloys, as shown in ASTM Standards Vol. 03.04.

As the contactor tip moves against the element surface wear occurs on both surfaces. The prior art contactor tips are formed from a metal having good wear resistance and spring characteristics, for example beryllium copper. The prior art resistive elements have been formed from carbon and polymer combinations that are screened onto a substrate and dried.

Examples of patents related to the present invention are as follows, and each patent is herein incorporated by reference for the supporting teachings:

U.S. Pat. No. 5,416,295 is a combined pedal force switch and position sensor.

U.S. Pat. No. 5,415,144 is a throttle position validation method and apparatus.

U.S. Pat. No. 5,385,068 is an electronic accelerator pedal assembly with pedal force sensor.

U.S. Pat. No. 5,321,980 is an integrated throttle position sensor with independent position validation sensor.

U.S. Pat. No. 5,133,321 is an integrated throttle control and idle validation sensor.

U.S. Pat. No. 5,039,975 is a resistor substrate for a variable resistor employed in a throttle sensor.

U.S. Pat. No. 4,703,649 is a throttle valve opening sensor.

U.S. Pat. No. 4,688,420 is a throttle valve position detecting device for a vehicle engine.

U.S. Pat. No. 4,616,504 is a throttle position sensor with a potentiometer module that fits into a connector casing.

U.S. Pat. No. 4,435,691 is a dual track resistor element having nonlinear output.

U.S. Pat. No. 4,334,352 is a method of making a variable resistance control.

U.S. Pat. No. 4,430,634 is a rotary potentiometer with molded terminal package.

The foregoing patents reflect the state of the art of which the applicant is aware and are tendered with the view toward discharging applicants' acknowledged duty of candor in disclosing information that may be pertinent in the examination of this application. It is respectfully stipulated, however, that none of these patents teach or render obvious, singly or when considered in combination, the applicant's claimed invention.

3. Problem with the Related Art

There are several common problems occurring with the prior art. As the metal contactor tip moves against the element over time, it can gouge and pit the element causing the resistance reading to fail or to generate an erroneous resistance reading. Another problem with the prior art devices is that over time the element material can be removed from the element and build up as a loose layer over the surface of the element. When the contactor tip is moved it skates across the surface of the loose material instead of making electrical contact with the element. This causes the resistance reading from the element to appear as an open circuit with infinite resistance and essentially causes the sensor to be inoperative for a period of time until contact is reestablished by the contactor tip to the element.

Poor electrical contacts have often been found associated with the metal contactors, even with noble alloy contactors. As a result, electrical noise is generated from these contactors, which lowers the performance and reliability, and ultimately causes failure of the sensor devices. Excessive wear either from the contactor itself or from the polymer resistive elements has also often been found in this type of sensors, which reduces the durability and even causes premature failure of the sensor devices.

Prior art contacting position sensor designers have attempted to solve these problems by introducing a lubricant into the contactor tip/element interface. A typical lubricant is an emulsification of Teflon particles. The lubricant reduces the frictional forces between the wear surface while still allowing electrical contact to be made between the contactor tip and the resistive element. The liquid lubricant is applied to the contact surfaces to reduce the wear. However, most of the liquid lubricants are poor electrical conductors, thereby causing relatively high electrical resistance across contact surfaces and possible failure of the devices where lubricants have been used improperly. The viscosity of the liquid lubricant changes significantly over the application temperature range, resulting in poor contact at low temperatures and insufficient lubrication at high temperatures. There are several other problems that arise from using a lubricant in the contactor system. First, the amount of lubricant applied is critical to the performance of the system. If too little lubricant is applied, the system will have excessive wear. If too much is applied, erroneous resistance readings due to skating will occur. It is very difficult to repeatably apply a uniform layer of the lubricant. Second, using a lubricant adds additional cost in material and labor to the overall sensor cost. Therefore, there is a need for a less expensive sensor unit that can eliminate the use of lubricants and has improved wear characteristics.

The preferred embodiment of the invention is designed to solve the problems herein described and other problems not discussed, which are discoverable by a skilled artisan.

SUMMARY OF THE INVENTION

It is a feature of the invention to provide a position sensor. In particular, there is a contacting position sensor that has a housing and a resistive element that is located on a substrate and mounted within the housing. A carbon fiber contactor is mounted within the housing and has a first and second beam and several carbon fibers attached to an end of each of the beams. The carbon fibers are in electrical contact with the resistive element. The carbon fibers extend through an aperture in the beam and are attached by an epoxy or the carbon fibers are attached to the beam by a crimp in the beam. The resistive element has one or more resistors each having a pair of output pads. The contactor is attached to a rotor or a drive arm.

Another feature of the invention is to provide a contacting position sensor that has low wear characteristics without using expensive lubricants.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention. Further, the abstract is neither intended to define the invention of the application, which is measured by the claims, neither is it intended to be limiting as to the scope of the invention in any way.

Figure 1:
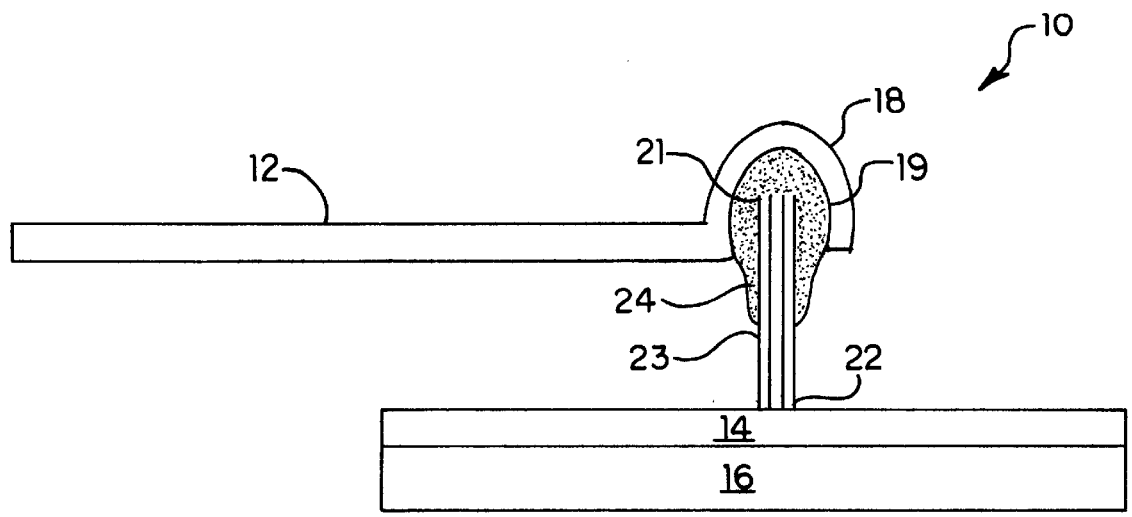
FIG. 1 is a side view of the carbon fibers attached to a beam using a conductive epoxy.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements between the drawings.

DETAILED DESCRIPTION OF THE PREFERRED EMBODIMENT

Referring to FIG. 1, a carbon fiber contactor assembly 10 is shown. An elongated metal beam 12 has a semi-circular shaped end 18 with a recess 19. Several carbon fibers 23 are held together on one end 21 in recess 19 by a conductive epoxy 24. The metal beam is preferably formed from a non-ferrous spring metal such as brass or beryllium copper. The carbon fibers are 10 micron diameter carbon fibers, fiber type P55, commercially available from Amoco Corporation, Chicago, Ill. The conductive epoxy is a silver conductive epoxy Ablebond 84-1LMISR4, commercially available from Ablestik Labs, Rancho Dominguez, Calif. The other end of the carbon fibers 22 is in electrical contact with a resistive element 14. Resistive element 14 rests on and is supported by a flexible film or substrate 16.

During operation the carbon fibers 23 move over the resistive element 14 causing a voltage reading to change and an electrical signal to pass through the beam 12, carbon fibers 23 and resistive element 14. In a typical position sensor application, a pair of electrically connected contactor assemblies 10 are used along with a pair of resistive elements 14 that are electrically connected. The path of the electrical circuit is as follows, a position dependent voltage from resistive element 14 is communicated through carbon fiber end or tip 22, carbon fibers 23, beam 12, other beam 12, other carbon fibers 23, other carbon fiber tip 22 and through other resistive element 14 which is connected to the output of the sensor.

Fiber tip 22 after attachment can be trimmed with laser, water jet or other mechanical means. Fiber tip 22 can also be polished with fine abrasive surface to improve the contact.

Figure 2:
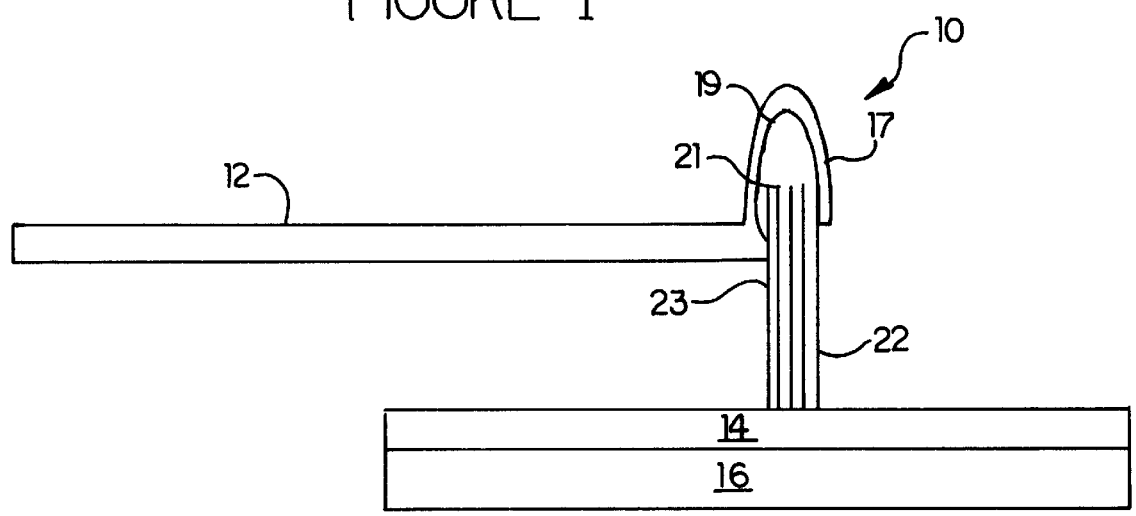
FIG. 2 is a side view of the carbon fibers crimped to a beam.

Referring to FIG. 2, the preferred embodiment of a carbon fiber contactor assembly 10 is shown. An elongated metal beam 12 has a U-shaped end 17 with a recess 19. Several carbon fibers 23 are held together on one end 21 in recess 19 by crimping the U-shaped end 17 around fibers 23. If desired the U-shaped end 17 can be spot welded to enhance the holding of the fibers 23. The other end of the carbon fibers 22 is in electrical contact with a resistive element 14. Resistive element 14 rests on and is supported by a flexible film or substrate 16. The operation of the contactor of FIG. 2 is the same as in FIG. 1.

Figure 3:
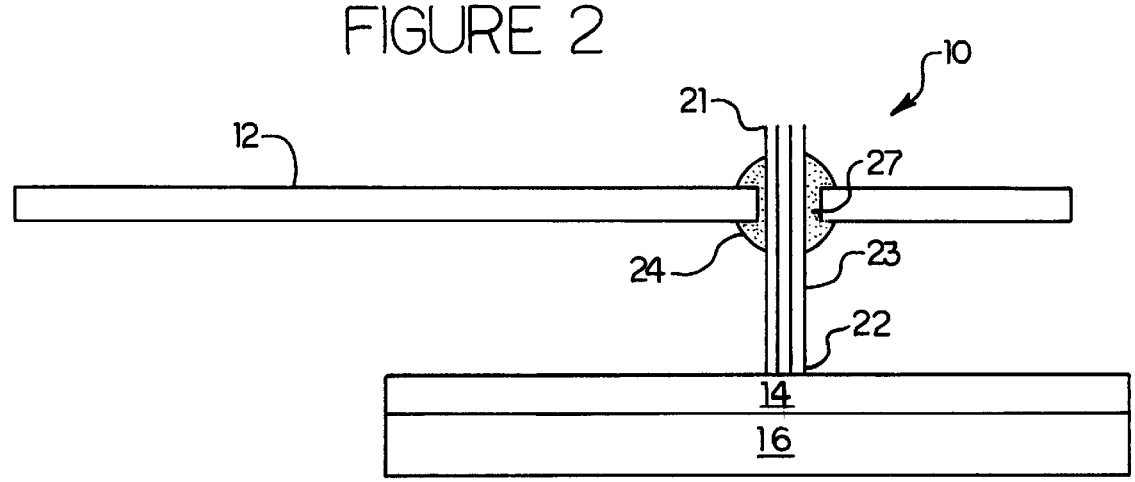
FIG. 3 is a side view of the carbon fibers attached through an aperture in the beam using a conductive epoxy.

Referring to FIG. 3, another embodiment of a carbon fiber contactor assembly 10 is shown. An elongated metal beam 12 has an aperture 27. Several carbon fibers 23 extend through aperture 27 and are bonded to beam 12 by a conductive epoxy 24. One end of the carbon fibers 21 extend above beam 12. The other end of the carbon fibers 22 is in electrical contact with a resistive element 14. Resistive element 14 rests on and is supported by a flexible film or substrate 16. The operation of the contactor of FIG. 2 is the same as in FIG. 1.

Figure 4:
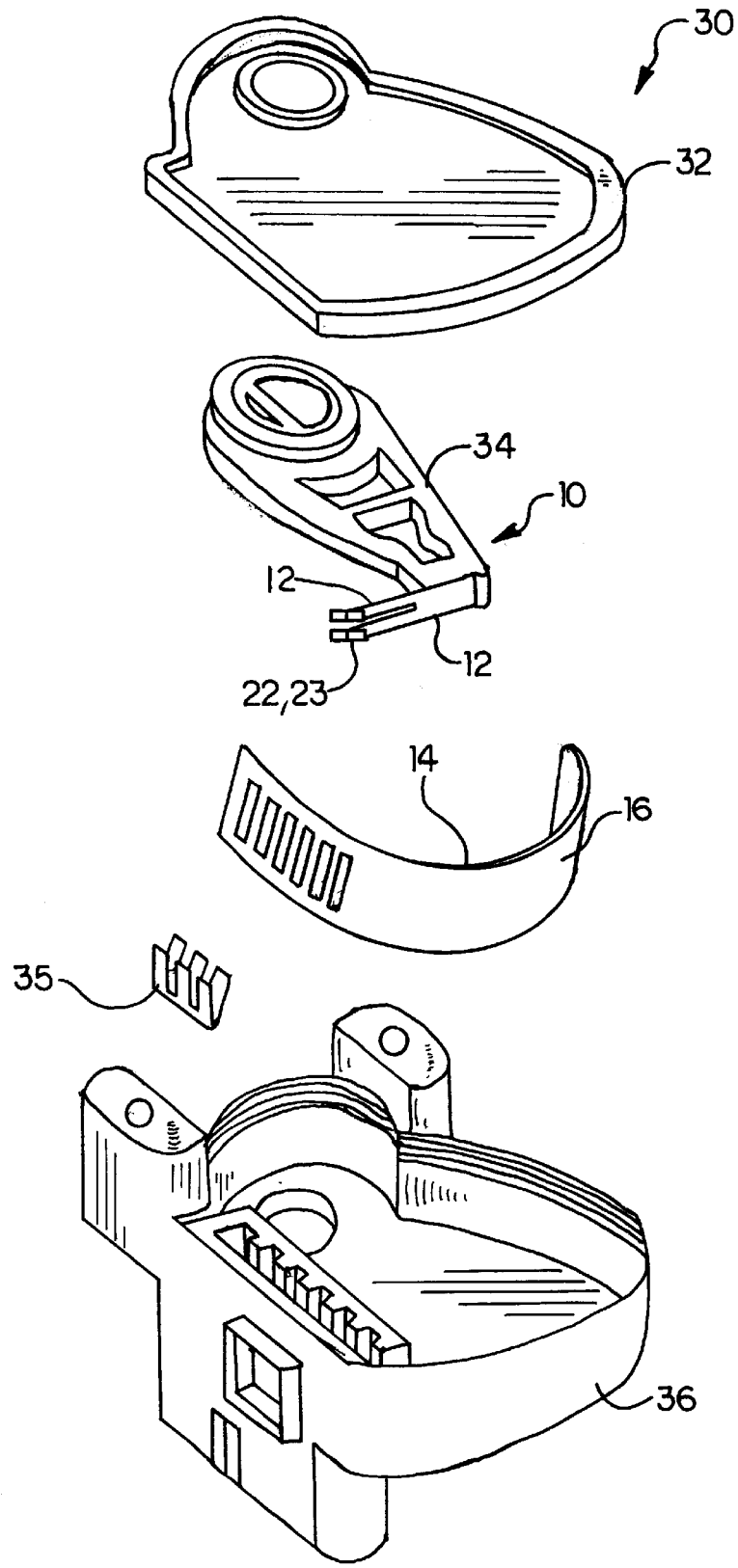
FIG. 4 is a perspective drawing of a position sensor incorporating the carbon fiber contactor.

Referring to FIG. 4, there is a contacting position sensor assembly 30. In particular, sensor 30 has a housing 36, a cover 32 forming a top side of the sensor unit 30, a rotor 34, a flexible film or substrate 16, and a connector 35. Carbon fiber contactor assembly 10 is attached to rotor 34 by suitable means such as heat staking, adhesives or mechanical fasteners such as screws. Flexible film 16 rests in housing 36 as does the rotor 34. Connector 35 connects resistive element 14 on film 16 to another external connector (not shown). Cover 32 would be placed over housing 36 to complete the sensor assembly 30.

During operation, a shaft (not shown) is engaged with rotor 34 which causes rotor 34 to turn. Rotation of rotor 34 in turn causes contactor assembly 10 to move with respect to resistive element 14. This causes carbon fiber tip 22 to move along resistive element 14. This in turn causes the voltage output reading of an applied signal to change according to the position of rotor 34.

Remarks About the Preferred Embodiment

One of ordinary skill in the art of designing and using position sensors will realize many advantages from studying and using the preferred embodiment. For example, the carbon fiber contactor 10, in contrast to the conventional metallic materials, has high electrical conductivity, high mechanical strength and high wear resistance, chemical inertness, stability at elevated temperatures and good corrosion resistance.

Various parameters must be taken into account when designing a contacting sensor such as the fiber tip length, contact angle to the resistive element, fiber tip thickness and width. The design parameters for the contactor beam include the contactor load force, stiffness, and flexibility. The fiber tip after attachment can be trimmed with laser or other mechanical means. The fiber tip can also be polished with fine abrasive surface to improve the contact.

Carbon fiber contactor 10 has other advantages such as prolonged service life and contact resistance that throughout the life of the sensor remains consistent. The contactor 10 does not require any kind of lubricant; therefore it can operate under wider temperature ranges. The contactor 10 can also be operated at a higher sliding speed, because there is no skating or hydroplaning, a phenomenon associated with a liquid lubricant. In addition, carbon fiber contactor 10 has demonstrated the capability of dealing with wear debris and film build-up, the common source of noise in a sliding contact due to the cleaning effect from the brush type of fiber tip.

Using the carbon fiber contactor 10 results in significantly lower wear of the resistive element 14 and more consistent contact resistance are achievable. The sweeping action of each individual fiber bristle also makes the build up of wear debris very difficult.

Variations of the Preferred Embodiment

Although the illustrated embodiments discuss the arrangement of holding the carbon fibers 23 to a metal beam 12, it is contemplated to use other types of beams such as plastic and then use a wire to connect with the carbon fibers. Further, the beam itself could be formed from carbon fibers as an integral unit.

Although the preferred embodiment depicts a certain shaped beam 12, many variations are possible. For example, the beam 12 could extend vertically away from element 14, with the fibers 23 attached to the end of the beam 12.

Even though the preferred embodiment describes placing the fibers 23 onto beam 12, the fibers could be directly bonded to the rotor 34, eliminating the beam 12.

The substrate 16 for the resistive element 14 was described as a flexible film. It is possible for substrate 16 to be a ceramic or a printed circuit board.

The invention has described the use of carbon fibers. However, It is contemplated that other conductive fiber materials could also be used, for example silicon carbide or conductive polymer fibers or conductive ceramic fibers would be suitable. A skilled artisan will realize that any non-metallic conductive fiber material will also work.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the description. All changes that come within the meaning and range of equivalency of the claims are to be embraced within their scope.

What is claimed and desired to be secured by United States Patent is:

1. A contacting position sensor, comprising:
    a) a carbon fiber contactor having an elongated beam and a plurality of carbon fibers forming a bundle having first and second ends and attached to the beam;
    b) a resistive element, disposed adjacent the contactor, the carbon fibers in electrical contact with the resistive element; and
    c) the beam having a u-shaped end, the carbon fibers held in the u-shaped end by compressive forces between the elongated beam and a portion of the u-shaped end, with the carbon fiber bundle terminating at the first end inside the u-shaped end and emanating therefrom at the second end.

2. The position sensor of claim 1, wherein the u-shaped end defines a recess therein, the first end extending into the recess.

3. The position sensor of claim 2, wherein the compressive forces are generated by crimping the u-shaped end about the carbon fibers.

4. The position sensor of claim 3, wherein the elongated beam and a portion of the u-shaped end are further held together by a spot weld.

5. The position sensor of claim 1, wherein the carbon fiber contactor and the resistive element are contained within a housing.

6. The position sensor of claim 1, wherein the resistive element has at least one resistor and a pair of output pads.

7. The position sensor of claim 1, wherein the carbon fiber contactor is attached to a rotor.

8. A contacting position sensor, comprising:
    a) a carbon fiber contactor having an elongated beam and a plurality of carbon fibers forming a bundle having first and second ends and attached to the beam;
    b) a resistive element, disposed adjacent the contactor, the carbon fibers in electrical contact with the resistive element; and
    c) the beam having an aperture therein, the bundle of carbon fibers held in the aperture by a conductive epoxy, the first end opposite the aperture from the second end, the second end extending through the aperture such that the first and second ends extend outwardly on either side of the beam and the aperture.

9. The position sensor of claim 8, wherein the carbon fiber contactor and the resistive element are contained within a housing.

10. The position sensor of claim 9, wherein the resistive element has at least one resistor and a pair of output pads.

11. The position sensor of claim 8, wherein the carbon fiber contactor is attached to a rotor.

* * * * *